(12) United States Patent
Kondoh

(10) Patent No.: US 9,009,509 B2
(45) Date of Patent: Apr. 14, 2015

(54) VIRTUAL COMPUTER SYSTEM, DEVICE SHARING CONTROL METHOD, COMPUTER-READABLE RECORDING MEDIUM, AND INTEGRATED CIRCUIT

(75) Inventor: Takuya Kondoh, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 323 days.

(21) Appl. No.: 13/638,732

(22) PCT Filed: Oct. 28, 2011

(86) PCT No.: PCT/JP2011/006049
§ 371 (c)(1),
(2), (4) Date: Oct. 1, 2012

(87) PCT Pub. No.: WO2012/104940
PCT Pub. Date: Aug. 9, 2012

(65) Prior Publication Data
US 2013/0024705 A1 Jan. 24, 2013

(30) Foreign Application Priority Data
Feb. 4, 2011 (JP) .................................. 2011-022373

(51) Int. Cl.
*G06F 1/32* (2006.01)
*G06F 9/455* (2006.01)
(Continued)

(52) U.S. Cl.
CPC .......... *G06F 9/45533* (2013.01); *G06F 1/3203* (2013.01); *G06F 1/3228* (2013.01);
(Continued)

(58) Field of Classification Search
CPC . G06F 9/45533; G06F 1/3203; G06F 1/3228; G06F 9/4893; G06F 1/3206; G06F 9/5094; Y02B 60/144; Y02B 60/146; Y02B 60/142
USPC ............................................................ 713/3
See application file for complete search history.

(56) References Cited

U.S. PATENT DOCUMENTS

2006/0085794 A1 4/2006 Yokoyama
2008/0162800 A1 7/2008 Takashige et al.
(Continued)

FOREIGN PATENT DOCUMENTS

JP 3-122727 5/1991
JP 2006-113767 4/2006
(Continued)

OTHER PUBLICATIONS

International Search Report issued Dec. 13, 2011 in International (PCT) Application No. PCT/JP2011/006049.

*Primary Examiner* — Thomas Lee
*Assistant Examiner* — Mohammad A Rahman
(74) *Attorney, Agent, or Firm* — Wenderoth, Lind & Ponack, L.L.P.

(57) ABSTRACT

A total power saving controller AA06 judges whether two or more predetermined number of virtual computers AA01 are in a power saving state, referring to a virtual computer information table BB01, in the case where the total power saving controller AA06 receives, from one of the virtual computers AA01, a shift request requesting shifting the virtual computer AA01 from the power saving state thereof. A device control changer AA07 decides, out of all devices AA08 corresponding to the virtual computers AA01 in the power saving state, one of the devices to be operated as an operating device, and the rest of the devices as a degraded device, for causing the operating device to perform a degraded control of the degraded device, in the case where the total power saving controller AA06 judges that all the virtual computers AA01 are in the power saving state.

14 Claims, 7 Drawing Sheets

(51) Int. Cl.
*G06F 9/48* (2006.01)
*G06F 9/50* (2006.01)

(52) U.S. Cl.
CPC ............ *G06F9/4893* (2013.01); *G06F 1/3206* (2013.01); *Y02B 60/144* (2013.01); *Y02B 60/146* (2013.01); *G06F 9/5094* (2013.01); *Y02B 60/142* (2013.01)

(56) References Cited

U.S. PATENT DOCUMENTS

2008/0229128 A1* 9/2008 Heller et al. .................. 713/320
2009/0138887 A1 5/2009 Uehara et al.
2010/0235662 A1* 9/2010 Nishtala ....................... 713/322

FOREIGN PATENT DOCUMENTS

| | | |
|---|---|---|
| JP | 2008-146566 | 6/2008 |
| JP | 2009-151745 | 7/2009 |
| JP | 2009-223793 | 10/2009 |
| JP | 2010-211546 | 9/2010 |
| JP | 2010-257209 | 11/2010 |
| JP | 2011-2993 | 1/2011 |

* cited by examiner

FIG.2

| | VIRTUAL COMPUTER AA01-1 | VIRTUAL COMPUTER AA01-2 | ... | VIRTUAL COMPUTER AA01-N |
|---|---|---|---|---|
| VIRTUAL COMPUTER STATE INFORMATION | POWER SAVING STATE | POWER SAVING STATE | ... | POWER SAVING STATE |
| DEVICE CONTROL INFORMATION | TIME OUT 3 SECONDS LATER | TIME OUT 2 SECONDS LATER | ... | TIME OUT 8 SECONDS LATER |
| DEVICE CONTROL CHANGE INFORMATION | CONTROL IS CHANGED | CONTROL IS NOT CHANGED | ... | CONTROL IS CHANGED |

BB01 VIRTUAL COMPUTER INFORMATION TABLE

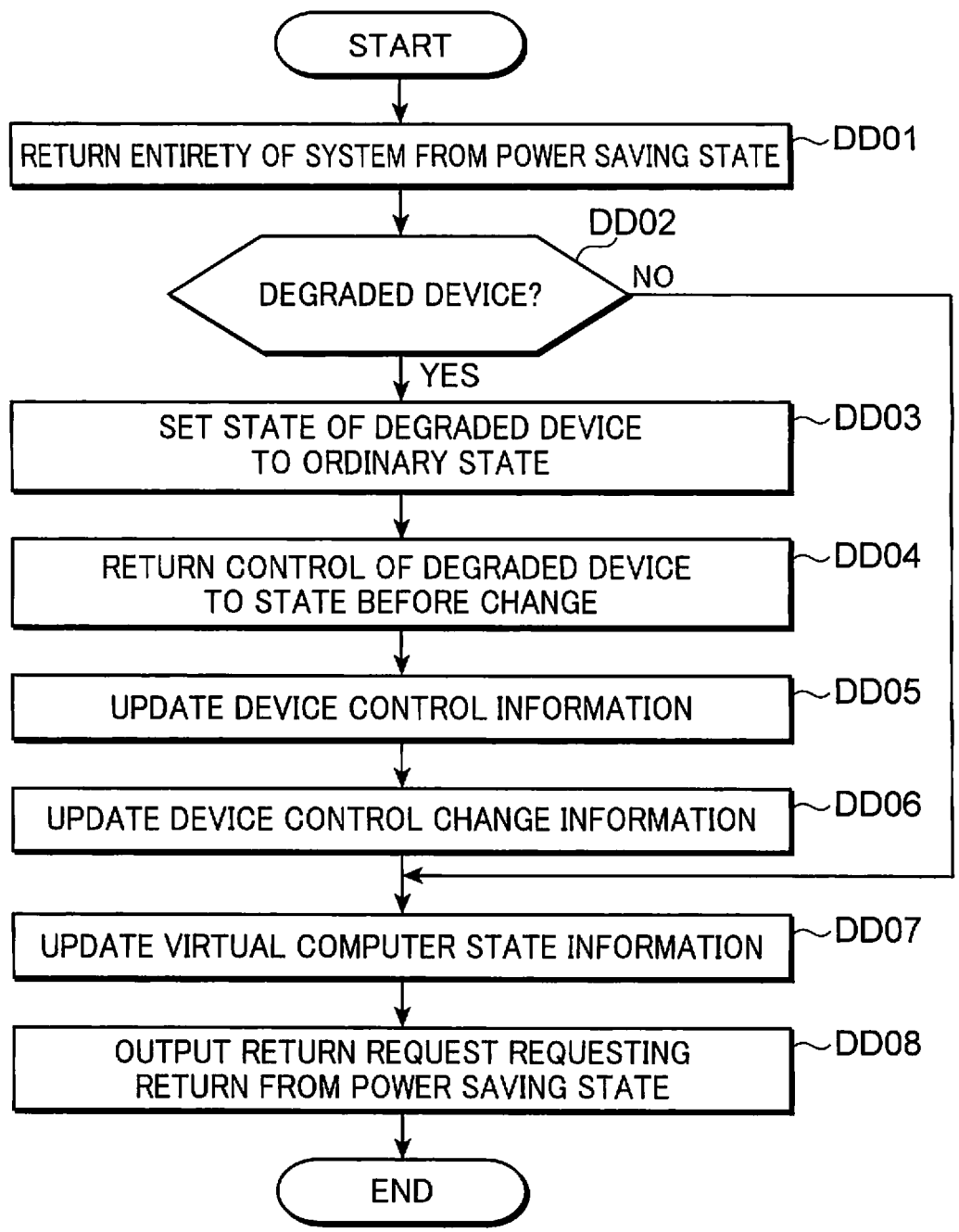

FIG.5

| | VIRTUAL COMPUTER AA01-1 | VIRTUAL COMPUTER AA01-2 | ... | VIRTUAL COMPUTER AA01-N |
|---|---|---|---|---|
| VIRTUAL COMPUTER STATE INFORMATION | POWER SAVING STATE | POWER SAVING STATE | ... | POWER SAVING STATE |
| DEVICE CONTROL INFORMATION | WAIT FOR PACKET (VIRTUAL COMPUTER AA01-1~ VIRTUAL COMPUTER AA01-N) | WAIT FOR PACKET | ... | WAIT FOR PACKET |
| DEVICE CONTROL CHANGE INFORMATION | CONTROL IS CHANGED | CONTROL IS NOT CHANGED | ... | CONTROL IS CHANGED |

EE01 VIRTUAL COMPUTER INFORMATION TABLE

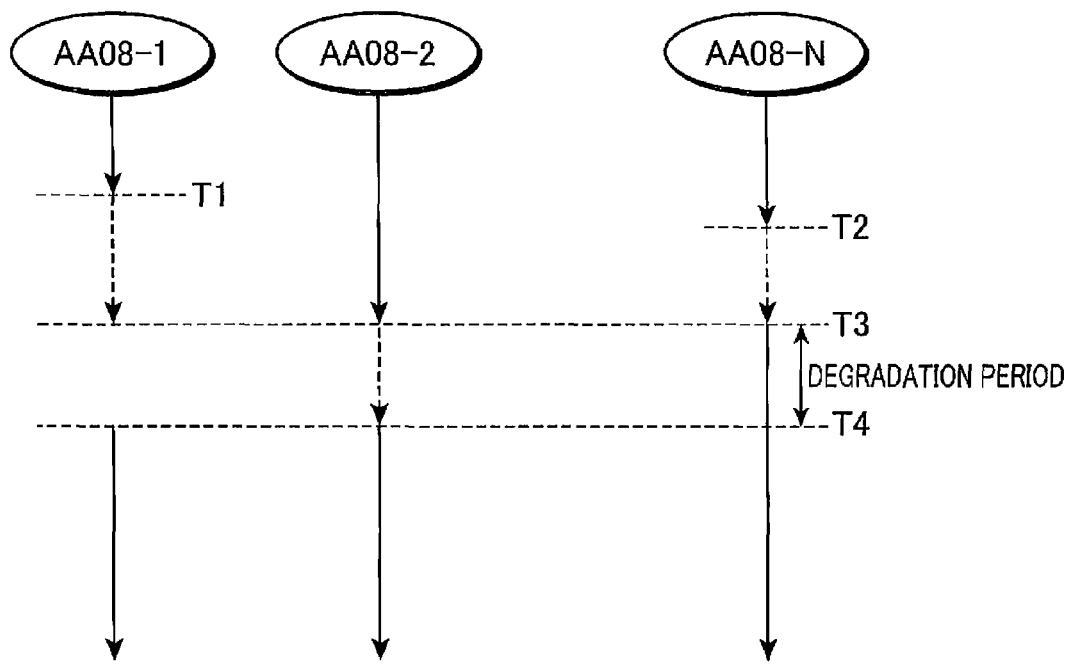

VIRTUAL COMPUTER SYSTEM, DEVICE SHARING CONTROL METHOD, COMPUTER-READABLE RECORDING MEDIUM, AND INTEGRATED CIRCUIT

TECHNICAL FIELD

The present invention relates to a technology, in a virtual computer system provided with virtual computers, devices to be exclusively used by the respective virtual computers, and a hypervisor, of causing the hypervisor to control the devices in shifting each of the virtual computers to a power saving state.

BACKGROUND ART

In recent years, there has been spread a virtualization technology that enables to logically divide one computer into a plurality of virtually independent virtual computers for operating the virtual computers. The virtual computer control technology has been mainly utilized in general-purpose large-scale computers. However, in recent years, the virtual computer control technology has started to be used in data centers using inexpensive computers on the basis of a PC (Personal Computer) architecture for the purpose of reducing the running cost such as reducing the number of physical computers, reducing the power consumption, and simplifying the management.

There are roughly proposed two schemes as the device control in the virtual computer system utilizing the virtualization technology.

The first scheme is a scheme according to which a virtual computer exclusively uses a device. Hereinafter, the first scheme is called as a dedicated scheme. In the dedicated scheme, a virtual computer exclusively uses a device. Therefore, in controlling a device, a processor is not required to execute a processing, taking into account sharing the device by a plurality of virtual computers, and generally, degradation of the performance resulting from virtualization is small. On the other hand, in the dedicated scheme, power consumption is large, as compared with a second scheme to be described below, because the electric power consumption rate increases as the number of physical devices increases.

The second scheme is a scheme according to which a plurality of virtual computers share a device in operation. Hereinafter, the second scheme is called as a shared scheme. In the shared scheme, a plurality of virtual computers share a device in operation. Therefore, in controlling a device, a processor is required to execute a processing, taking into account sharing the device by a plurality of virtual computers, and generally, degradation of the performance resulting from virtualization is large. On the other hand, power consumption is small as compared with the first scheme, because the number of physical devices in operation decreases.

As described above, the two schemes have trade-off relations with each other in the aspect of performance and power consumption. Accordingly, there is a demand for a device control technology which meets the requirements on performance and power consumption.

In the following, three patent literatures 1 through 3 are described as existing device control related technologies, and the technologies disclosed in patent literatures 1 through 3 are briefly described.

Patent literature 1 discloses a method for sharing a device while avoiding degradation of the performance by switching the device control scheme from a dedicated scheme to a shared scheme or from the shared scheme to the dedicated scheme, depending on a change in usage of a virtual device.

Patent literature 2 discloses a power consumption reducing method, in which power saving control of physical resources in an inactive state and to be shared by a plurality of virtual computers is enabled by managing usage of the physical resources of the virtual computers, using a management operating system for managing physical resources assigned to virtual computers.

Patent literature 3 discloses an information processing device for controlling hardware resources corresponding to respective operating systems (OSs), wherein input/output control is executed for a device by a direct I/O method when an OS issues a state control request requesting turning on the power to the device, and input/output control is executed for the device by an emulation method when an OS issues a state control request requesting turning off the power to the device.

However, in the methods disclosed in patent literatures 1, 3, it is impossible to reduce power consumption of a device, because there is no power saving control means for the device. Further, in the method disclosed in patent literature 2, although there is a means for saving the power of a device in an inactive state, there is no means for switching the device control scheme. Accordingly, in the case where a device is shared and controlled by a plurality of virtual computers, the performance may be degraded.

CITATION LIST

Patent Literature

Patent literature 1: Japanese Unexamined Patent Publication No. 2008-146566
Patent literature 2: Japanese Unexamined Patent Publication No. 2006-113767
Patent literature 3: Japanese Unexamined Patent Publication No. 2009-223793

SUMMARY OF INVENTION

An object of the invention is to provide a virtual computer system and the like which enable to reduce the power consumption rate, while avoiding degradation of the performance by sharing a device.

A virtual computer system according to an aspect of the invention is a virtual computer system including a plurality of virtual computers; a plurality of devices provided in correspondence to the respective virtual computers and to be exclusively used by the respective corresponding virtual computers; and a hypervisor for controlling the virtual computers. The virtual computer includes a device controller which controls the corresponding device; and a power saving controller which executes power saving control of the corresponding virtual computer. The hypervisor includes a total power saving controller which manages a state of each of the virtual computers; a virtual computer information storage which stores virtual computer information, the virtual computer information including a state of the virtual computer and information relating to control of the device; and a device control changer which changes the control of the device. In the above arrangement, in the case where the total power saving controller receives, from the power saving controller, a shift request requesting shifting the virtual computer corresponding to the power saving controller from an ordinary state to a power saving state, the total power saving controller judges whether two or more predetermined number of the virtual computers including the virtual computer which has outputted the shift request are in the power saving state, referring to the virtual computer information, and in the case where the total power saving controller judges that the predetermined number of the virtual computers are in the power saving state, the device control changer decides, out of the devices corresponding to the virtual computers in the power saving state, one of the devices to be operated as an operating device, and the rest of the devices as a degraded device, for causing the operating device to perform a degraded control of the degraded device.

Further, a device sharing control method, a program, and an integrated circuit according to another aspect of the invention has the features of the aforementioned virtual computer system.

BRIEF DESCRIPTION OF DRAWINGS

FIG. 2 is a diagram showing an example of a virtual computer information table stored in a virtual computer information storage in the first embodiment of the invention;

FIG. 4 is a flowchart for describing an operation to be executed when the virtual computer system in the first embodiment of the invention is returned from the power saving state to the ordinary state;

FIG. 5 is a diagram showing an example of a virtual computer table in a third embodiment of the invention;

FIGS. 6A, 6B are explanatory diagrams showing an example of an operation to be executed by a virtual computer system in a second embodiment, wherein FIG. 6A shows a case that a conventional configuration is applied, and FIG. 6B shows a case of the second embodiment; and FIG. 7 is an explanatory diagram showing an example of an operation to be executed by the virtual computer system in the third embodiment.

DESCRIPTION OF EMBODIMENTS

Figure 1:
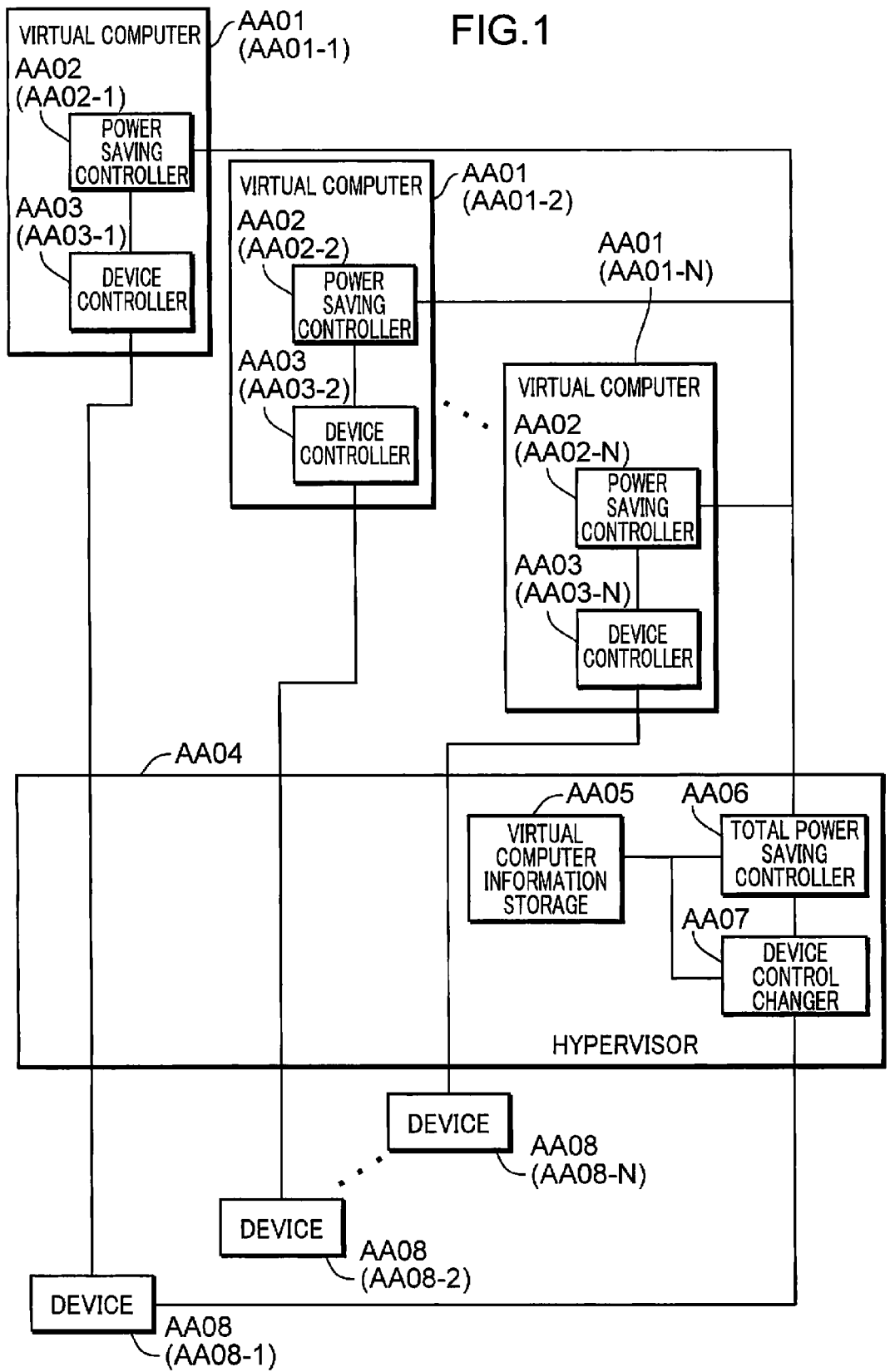
FIG. 1 is a block diagram showing a configuration of a virtual computer system in a first embodiment of the invention.

In the following, embodiments of the invention will be described referring to the drawings.

First Embodiment

FIG. 1 is a block diagram showing a configuration of a virtual computer system in the first embodiment of the invention. As shown in FIG. 1, the virtual computer system in the first embodiment of the invention is provided with plural (N) (where N is a positive integer of 2 or larger) virtual computers AA01-1 through AA01-N, devices AA08-1 through AA08-N provided in correspondence to the N virtual computers AA01-1 through AA01-N, and a hypervisor AA04 for controlling the virtual computers AA01-1 through AA01-N.

In this example, in the case where the virtual computers AA01-1 through AA01-N are not discriminated from each other and the devices AA08-1 through AA08-N are not discriminated from each other, the symbol "AA01" is assigned to the virtual computers, and the symbol "AA08" is assigned to the devices.

The virtual computer AA01 exclusively controls the device AA08 corresponding to the virtual computer AA01, in the case where the system is in a state other than a power saving state i.e. is in an ordinary state.

The virtual computers AA01-1 through AA01-N are respectively provided with power saving controllers AA02-1 through AA02-N which execute power saving control of the virtual computers AA01-1 through AA01-N, and device controllers AA03-1 through AA03-N which control the devices AA08-1 through AA08-N. Hereinafter, in the case where the power saving controllers AA02-1 through AA02-N are not discriminated from each other and the device controllers AA03-1 through AA03-N are not discriminated from each other, the symbol "AA02" is assigned to the power saving controllers, and the symbol "AA03" is assigned to the device controllers.

In this example, the power saving control means controlling the device AA08 to shift to the power saving state, and controlling the device AA08 to return from the power saving state.

When the virtual computer AA01 is shifted to the power saving state, the power saving controller AA02 outputs, to a total power saving controller AA06, a shift request requesting shifting the virtual computer AA01 from the ordinary state to the power saving state. Further, when the virtual computer AA01 is returned from the power saving state to the ordinary state, the power saving controller AA02 receives, from the total power saving controller AA06, a return request requesting returning the virtual computer AA01 from the power saving state to the ordinary state.

In the case where the virtual computer AA01 is shifted from the ordinary state to the power saving state, the power saving controller AA02 executes a power saving processing of stopping a processing that is being executed on the virtual computer AA01, stopping a processing that is cyclically executed on the virtual computer AA01, or shifting the device AA08 that is exclusively used by the virtual computer AA01 from the ordinary state to the power saving state. When the device AA08 is shifted from the ordinary state to the power saving state, the power saving controller AA02 outputs a shift request to the device controller AA03 so that the device controller AA03 shifts the device AA08 from the ordinary state to the power saving state.

In the case where the device AA08 is shifted from the ordinary state to the power saving state, the device controller AA03 executes a power saving processing of stopping supply of clocks to the device AA08 or shutting off power supply to the device AA08. These power saving processings may be used solely or in combination. Further, these power saving processings are merely an example of the processings to be executed when each of the virtual computers AA01 and the devices AA08 is shifted to the power saving state, and the present invention is not limited to these processings.

On the other hand, in the case where the virtual computer AA01 is returned from the power saving state to the ordinary state, the power saving controller AA02 executes a return processing of resuming a processing in an inactive state or a processing that is cyclically executed but is currently in an inactive state on the virtual computer AA01, or returning the device AA08 that is exclusively used by the virtual computer AA01 from the power saving state to the ordinary state. In the case where the device AA08 is returned from the power saving state to the ordinary state, the power saving controller AA02 outputs a return request to the device controller AA03 so that the device controller AA03 returns the device AA08 from the power saving state to the ordinary state.

In the case where the device AA08 is returned from the power saving state to the ordinary state, the device controller AA03 executes a return processing of e.g. resuming supply of clocks to the device AA08, or resuming power supply to the device AA08. In other words, the power saving controller AA02 executes a return processing corresponding to the aforementioned power saving processing.

The hypervisor AA04 is provided with a virtual computer information storage AA05 which stores a virtual computer information table (an example of virtual computer information) including a state of the virtual computer AA01 and information relating to control of the device AA08, the total power saving controller AA06 which executes power saving control of the entirety of the virtual computer system, and a device control changer AA07 which changes the control of the device AA08.

Changing the control of the device AA08 depends on the type of the device AA08. For instance, in the case where the device AA08 is a timer, changing the control such as stopping the operation of the timer or resuming the operation of the timer is applied.

FIG. 2 is a diagram showing an example of a virtual computer information table BB01 to be stored in the virtual computer information storage AA05 in the first embodiment of the invention.

As shown in FIG. 2, the virtual computer information table BB01 is provided with virtual computer state information indicating whether the virtual computer AA01 is in the power saving state, device control information indicating control contents of the device AA08, and device control change information indicating whether the control of the device AA08 has been changed. In this example, the virtual computer state information indicates a state of the virtual computer AA01, and the device control information and the device control change information indicate the information relating to the control of the device AA08.

FIG. 2 shows the virtual computer information table BB01 in the case where a timer is used as the device AA08. In FIG. 2, referring to the columns of the virtual computer AA01-1, "POWER SAVING STATE" is written in "VIRTUAL COMPUTER STATE INFORMATION", "TIME OUT 3 SECONDS LATER" is written in "DEVICE CONTROL INFORMATION" and "CONTROL IS CHANGED" is written in "DEVICE CONTROL CHANGE INFORMATION". This means that the virtual computer AA01-1 is in the power saving state, the device AA08-1 has been controlled to time out 3 seconds later so that the virtual computer AA01-1 is returned to the ordinary state, and the control that the device AA08-1 will be timed out 3 seconds later has been changed.

On the other hand, referring to the column of the virtual computer AA01-2, "POWER SAVING STATE" is written in "VIRTUAL COMPUTER STATE INFORMATION", "TIME OUT 2 SECONDS LATER" is written in "DEVICE CONTROL INFORMATION", and "CONTROL IS NOT CHANGED" is written in "DEVICE CONTROL CHANGE INFORMATION". This means that the virtual computer AA01-2 is in the power saving state, the device AA08-2 is controlled to time out 2 seconds later so that the virtual computer AA01-2 is returned to the ordinary state, and the control that the device AA08-2 is timed out 2 seconds later has not been changed.

Referring back to FIG. 1, in the case where the total power saving controller AA06 receives, from the power saving controller AA02, a shift request requesting returning the virtual computer AA01 corresponding to the power saving controller AA02 from the ordinary state to the power saving state, the total power saving controller AA06 judges whether all the virtual computers AA01 are in the power saving state, referring to the virtual computer information table BB01.

In the case where the total power saving controller AA06 judges that all the virtual computers AA01 are in the power saving state, the device control changer AA07 decides, out of all the devices AA08, one of the devices as an operating device, and the rest of the devices as a degraded device, and causes the operating device to perform a degraded control of the degraded device.

In the case where the device AA08 is constituted of a timer, and the virtual computer AA01 corresponding to the device AA08 is brought to the power saving state, the device AA08 measures a time-out time until the virtual computer AA01 corresponding to the device AA08 is returned to the ordinary state. The device AA08 is provided with a register, and when the device AA08 starts measuring the time, the time is written into the register, as needed.

Figure 3:
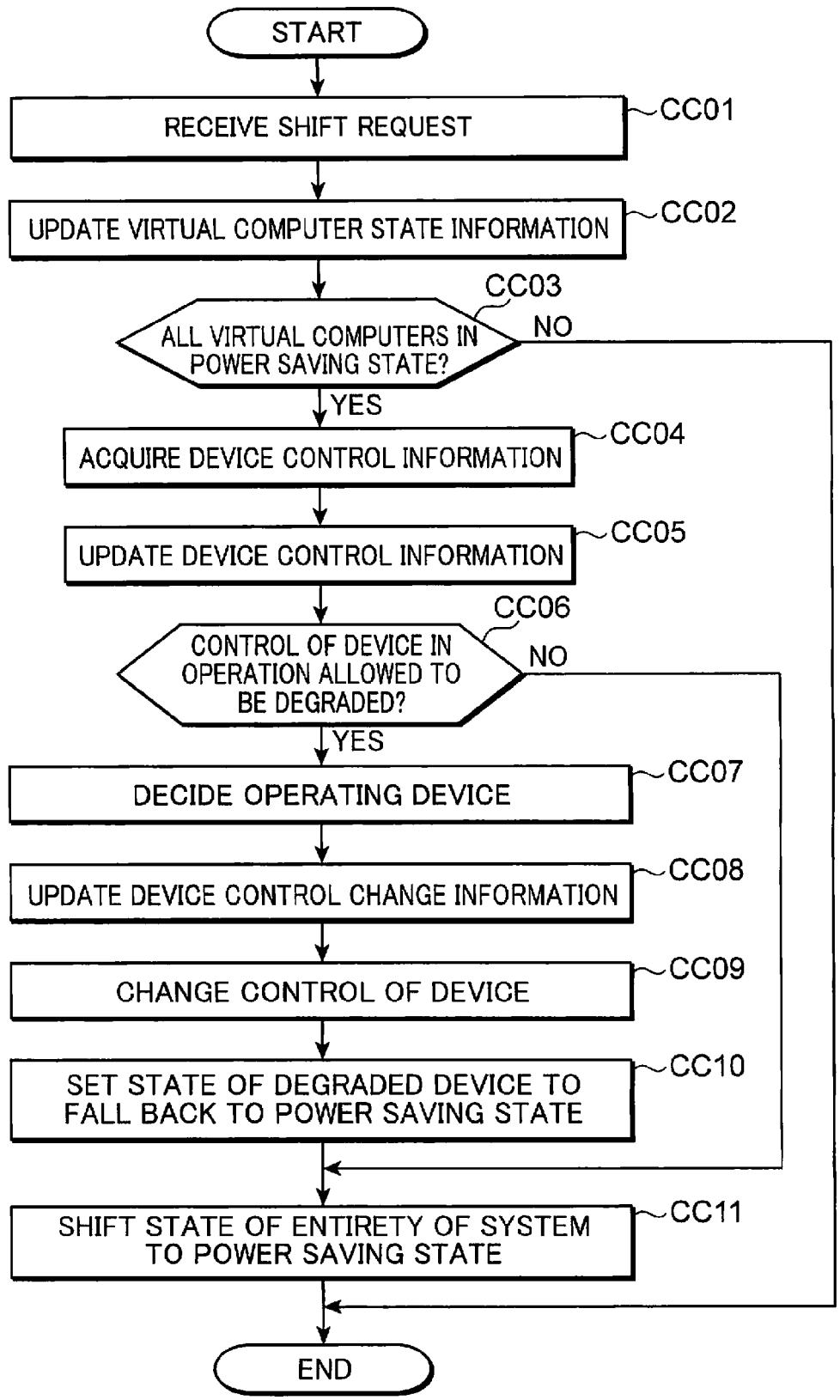
FIG. 3 is a flowchart for describing an operation to be executed when the virtual computer system in the first embodiment of the invention is shifted from an ordinary state to a power saving state.

FIG. 3 is a flowchart for describing an operation to be executed when the virtual computer system in the first embodiment of the invention is shifted from the ordinary state to the power saving state. Hereinafter, description is made based on the premise that the device AA08 is constituted of the devices AA08-1, AA08-2, AA08-N.

First, the total power saving controller AA06 receives, from the power saving controller AA02 of a certain virtual computer AA01, a shift request requesting shifting the virtual computer AA01 corresponding to the power saving controller AA02 from the ordinary state to the power saving state (Step CC01). In this example, if the power saving controller AA02 is the power saving controller AA02-1, the virtual computer AA01 corresponding to the power saving controller AA02 is the virtual computer AA01-1, because the power saving controller AA02-1 belongs to the virtual computer AA01-1.

Next, the total power saving controller AA06 updates the "VIRTUAL COMPUTER STATE INFORMATION" in the virtual computer information table BB01, on the basis of the shift request requesting shifting the virtual computer to the power saving state, which has been received in Step CC01 (Step CC02).

For instance, in the case where the total power saving controller AA06 receives, from the power saving controller AA02-1, a shift request requesting shifting the virtual computer to the power saving state, the total power saving controller AA06 updates the "VIRTUAL COMPUTER STATE INFORMATION" of the virtual computer AA01-1 in the virtual computer information table BB01 from the "ORDINARY STATE" to the "POWER SAVING STATE".

Next, the total power saving controller AA06 judge whether all the virtual computers AA01 are in the power saving state, referring to the virtual computer state information in the virtual computer information table BB01 (Step CC03).

In this example, in the case where it is judged that all the virtual computers AA01 are in the power saving state, in other words, all the virtual computers AA01-1, AA01-2, AA01-N are in the power saving state (YES in Step CC03), the processing is proceeded to Step CC04; and in the case where it is judged that all the virtual computers AA01 are not in the power saving state, in other words, at least one of the virtual computers AA01-1, AA01-2, AA01-N is in the ordinary state (NO in Step CC03), the processing is ended.

Next, the device control changer AA07 acquires control information on all the devices AA08 (Step CC04). In this example, since the control information is written in the register of the device AA08, the device control changer AA07 reads out the control information from the register.

In the case where the device AA08 is a timer, the device AA08 writes a currently measured time into the register as control information. Accordingly, the device control changer AA07 is operable to recognize a time-out time until each of the virtual computers AA01 is returned to the ordinary state by reading out the control information from the register in each of the devices AA08.

The aforementioned method for reading out control information from a register is merely an example, and the present invention is not limited to the above method. For instance, the following method may be adopted. A shared memory to be shared by the virtual computers AA01 and the hypervisor AA04 is additionally provided in the virtual computer system. Then, each of the devices AA08 writes control information into the shared memory. Then, the device control changer AA07 reads out, from the shared memory, the control information on each of the devices AA08 that has been written in the shared memory.

Next, the device control changer AA07 updates the device control information in the virtual computer information table BB01, with the control information on the device AA08 that has been acquired in Step CC04 (Step CC05). In this embodiment, since the device AA08 is a timer, the device control changer AA07 writes, in the virtual computer information table BB01, a time-out time until the virtual computer AA01 corresponding to the timer is returned to the ordinary state.

In the example shown in FIG. 2, the device control changer AA07 acquired the control information "3 SECONDS", "2 SECONDS", "8 SECONDS" from the devices AA08-1, AA08-2, AA08-N, respectively. Accordingly, in the virtual computer information table BB01 shown in FIG. 2, the information "TIME OUT 3 SECONDS LATER", "TIME OUT 2 SECONDS LATER", "TIME OUT 8 SECONDS LATER" is written in the column "DEVICE CONTROL INFORMATION" of the virtual computers AA01-1, AA01-2, AA01-N.

Next, the device control changer AA07 judges whether the control of the device AA08 in operation is allowed to be degraded, referring to the virtual computer information table BB01 (Step CC06).

In this example, the device control changer AA07 judges whether a device is allowed to be degraded, on the basis of e.g. the type of the device AA08. Specifically, the device control changer AA07 outputs a type acquisition request to each of the devices AA08 for acquiring information representing the type of the device AA08 from each of the devices AA08. Then, in the case where it is judged that the types of all the devices AA08 are the same as each other, and the type of the devices AA08 corresponds to the type of the device which is allowed to be degraded in advance, the device control changer AA07 determines that the device is allowed to be degraded.

In this example, the system may be configured in such a manner that in response to receiving a type acquisition request from the device control changer AA07, the device AA08 outputs information representing the type of the device AA08 to the device control changer AA07. Examples of the information representing the type include "timer" and "network card". In this example, a timer is used as the device AA08, and the timer is determined to be allowed to be degraded in advance. Therefore, the information "timer" is transmitted from all the devices AA08 to the device control changer AA07, as the information representing the type, and the device control changer AA07 determines that the judgment result in Step CC06 is affirmative.

If the device control changer AA07 has information representing the type of the device AA08 in advance, there is no need of executing the processing of Step CC06. For instance, if the device control changer AA07 is allowed to recognize in advance that all the devices AA08 are a timer, the judgment result in Step CC06 is constantly affirmative, because the timer is a device that is allowed to be degraded.

However, a user who purchased the virtual computer system may mount an optional device. In this case, the device control changer AA07 is unable to recognize the type of the device in advance.

In view of the above, the processing of Step CC06 is provided to cause the device control changer AA07 to recognize the type of the device AA08, thereby providing the virtual computer system with versatility.

In the case where it is determined that the device is allowed to be degraded (YES in Step CC06), the device control changer AA07 proceeds the processing to Step CC07, and in the case where it is determined that the device is not allowed to be degraded (NO in Step CC06), the device control changer AA07 proceeds the processing to Step CC11.

Next, the device control changer AA07 decides, out of all the devices AA08, one of the devices AA08 as an operating device, and the rest of the devices AA08 as a degraded device (Step CC07).

In this example, the devices AA08 are timers, and time-out times of the respective timers corresponding to the respective virtual computers AA01 are stored in the virtual computer information table BB01.

Accordingly, the device control changer AA07 decides one of the devices AA08 whose time-out time is shortest as an operating device, and decides the rest of the devices AA08 as a degraded device, referring to the virtual computer information table BB01.

In the case where the devices AA08 are timers, even if the timers other than the timer whose time-out time is shortest are stopped, it is possible to specify the time-out times of the rest of the timers at the time of releasing the degraded devices from the degraded state, on the basis of the time-out time of the timer whose time-out time is shortest and the time-out times of the rest of the timers. Then, time measurement by the rest of the timers is resumed when the timer whose time-out time is shortest is timed out, and the rest of the timers which resumed the time measurement are allowed to measure the respective times until the respective specified time-out times. This enables to return the virtual computers AA01 corresponding to the rest of the timers to the ordinary state at the respective initially scheduled time-out times.

In view of the above, in this embodiment, the device control changer AA07 decides one of the timers whose time-out time is shortest as an operating device, and the rest of the timers as degraded devices.

In the following, the processing in Step CC07 is concretely described referring to FIG. 2. In the virtual computer information table BB01, the timer whose time-out time is shortest is the timer of the virtual computer AA01-2, that is, the device AA08-2. Accordingly, the device control changer AA07 decides the device AA08-2 as an operating device, and the devices AA08-1, AA08-N other than the device AA08-2, as degraded devices.

Then, the device control changer AA07 stops the degraded devices to shift the degraded devices to the power saving state, and causes the operating device to perform a degraded control of the degraded devices. In other words, the device control changer AA07 causes only the device AA08-2 to measure the time, and stops the time measurement by the devices AA08-1, AA08-N.

By executing the above operation, it is possible to shorten the operation time of the devices AA08-1, AA08-N, as compared with the arrangement of causing all the devices AA08 to measure the time, whereby power saving is realized.

In this example, a timer is used as the device AA08. The invention is not limited to a timer. Specifically, any device is usable, as far as the device is capable of retaining control consistency, even in the case where the operating device performs a degraded control of the degraded device. For instance, a device that is cyclically driven, or a network interface card (NIC) which will be described in the third embodiment may be used.

Next, the device control changer AA07 updates the "DEVICE CONTROL CHANGE INFORMATION" in the virtual computer information table BB01 (Step CC08). In the example of the virtual computer information table BB01 shown in FIG. 2, since the time-out time of the device AA08-2 is shortest, the device AA08-2 is decided as the operating device, and the rest of the devices AA08 i.e. the devices AA08-1, AA08-N are decided as the degraded devices. In this example, the device control changer AA07 sets the "DEVICE CONTROL CHANGE INFORMATION" of the virtual computer AA01-2 to "CONTROL IS NOT CHANGED", and sets the "DEVICE CONTROL CHANGE INFORMATION" of the virtual computers AA01-1, AA01-N to "CONTROL IS CHANGED".

Next, the device control changer AA07 changes the control of the device AA08 of the virtual computer AA01 in which the "DEVICE CONTROL CHANGE INFORMATION" is set to "CONTROL IS CHANGED", referring to the "DEVICE CONTROL CHANGE INFORMATION" in the virtual computer information table BB01 (Step CC09). In the example shown in FIG. 2, the "DEVICE CONTROL CHANGE INFORMATION" of the virtual computers AA01-1, AA01-N is set to "CONTROL IS CHANGED". Accordingly, the device control changer AA07 stops the control of the devices AA08-1, AA08-N, and operates only the device AA08-2.

Next, the total power saving controller AA06 sets the states of the degraded devices to the power saving state (Step CC10). In the example shown in FIG. 2, the states of the devices AA08-1, AA08-N of the virtual computers AA01-1, AA01-N in which the "DEVICE CONTROL CHANGE INFORMATION" is set to "CONTROL IS CHANGED" are set to the power saving state, and the state of the device AA08-2 of the virtual computer AA01-2 in which the "DEVICE CONTROL CHANGE INFORMATION" is set to "CONTROL IS NOT CHANGED" is set to the ordinary state.

Next, the total power saving controller AA06 executes a processing of shifting the entirety of the virtual computer system to the power saving state for setting the state of the entirety of the virtual computer system to the power saving state, because all the virtual computers AA01 are brought to the power saving state (Step CC11).

FIG. 4 is a flowchart for describing an operation to be executed when the virtual computer system in the first embodiment of the invention is returned from the power saving state to the ordinary state.

First, when an event such as an interrupt occurs, the total power saving controller AA06 executes a processing of returning the entirety of the virtual computer system to the ordinary state for setting the state of the entirety of the virtual computer system from the power saving state to the ordinary state (Step DD01). In this example, the interrupt may e.g. a time-out interrupt that occurs when the operating device is timed out.

Next, the total power saving controller AA06 judges whether there is a degraded device, referring to the virtual computer information table BB01 (Step DD02). In the example of the virtual computer information table BB01 shown in FIG. 2, the "DEVICE CONTROL CHANGE INFORMATION" of the virtual computers AA01-1, AA01-N is set to "CONTROL IS CHANGED". Accordingly, the total power saving controller AA06 judges that there is a degraded device. In this example, in the case where it is judged that there is a degraded device (YES in Step DD02), the total power saving controller AA06 proceeds the processing to Step DD03: and in the case where it is judged that there is no degraded device (NO in Step DD02), the total power saving controller AA06 proceeds the processing to Step DD07.

Next, the total power saving controller AA06 sets the state of the degraded device to the ordinary state (Step DD03).

In the example shown in FIG. 2, the "DEVICE CONTROL CHANGE INFORMATION" of the devices AA08-1, AA08-N of the virtual computers AA01-1, AA01-N indicates "CONTROL IS CHANGED". Accordingly, the total power saving controller AA06 sets the state of these devices AA08 from the power saving state to the ordinary state.

Next, the device control changer AA07 returns the control of the degraded device to the state before the change, on the basis of the information in the virtual computer information table BB01 (Step DD04). For instance, let it be assumed that a time-out interrupt occurs in response to time-out of the device AA08-2, and the flowchart shown in FIG. 4 is started.

In this case, the virtual computer information table BB01 shows that the time-out time of the device AA08-2 is 2 seconds on the basis of the "DEVICE CONTROL INFORMATION" of the virtual computer AA01-2. Thus, it is clear that 2 seconds has elapsed after the operation of the devices AA08-1, AA08-N has been stopped. Further, the "DEVICE CONTROL INFORMATION" in the virtual computer information table BB01 shows that the time-out time of the device AA08-1 is 3 seconds after the operation is stopped, and the time-out time of the device AA08-N is 8 seconds after the operation is stopped.

Accordingly, by causing the device AA08-1 to time out upon lapse of 1 second from the current point of time, and by causing the device AA08-N to time out upon lapse of 6 seconds from the current point of time, it is possible to return the virtual computers AA01-1, AA01-N to the ordinary state at the respective initially scheduled time-out times.

In view of the above, the device control changer AA07 resumes the operation of the devices AA08-1, AA08-N at such timings that the devices AA08-1, AA08-N will be timed out 1 second later, 6 seconds later. The values of 1 second and 6 seconds are obtained by subtracting the time-out time of the device AA08-2 from the respective time-out times of the devices AA08-1, AA08-N.

By executing the above operation, the devices AA08-1, AA08-N are respectively timed out 1 second later, 6 seconds later from the current point of time. Thus, it is possible to return the virtual computers AA01-1, AA01-N at the respective initially scheduled time-out times.

There is a case that a certain interrupt occurs and the flowchart shown in FIG. 4 may be executed before the device AA08-2 is timed out. For instance, an interrupt of returning the virtual computer AA01-2 to the ordinary state may occur before the time-out time of the device AA08-2 elapses, and the flowchart shown in FIG. 4 may be executed.

In this case, the device control changer AA07 reads out the control information from the register in the device AA08-2, which is an operating device. For instance, let it be assumed that 1 second has elapsed.

Then, the device control changer AA07 resumes the operation of the devices AA08-1, AA08-N at such timings that the devices AA08-1, AA08-N are timed out 2 seconds later, 7 seconds later. The values of 2 seconds and 7 seconds are obtained by respectively subtracting 1 second, which is the acquired elapsed time, from 3 seconds, 8 seconds, which are the time-out times of the devices AA08-1, AA08-N. By executing the above operation, it is possible to return the virtual computers AA01-1, AA01-N at the respective initially scheduled time-out times.

Next, the device control changer AA07 updates the "DEVICE CONTROL CHANGE INFORMATION" in the virtual computer information table BB01, on the basis of the processing in Step DD04. In the case where a time-out interrupt by the device AA08-2 occurs, and the flowchart shown in FIG. 4 is started, the device control changer AA07 computes new time-out times of the devices AA08-1, AA08-N, i.e. 1 second, 6 seconds. Thus, the device control changer AA07 sets the DEVICE CONTROL INFORMATION" of the devices AA08-1, AA08-N to "TIME OUT 1 SECOND LATER", "TIME OUT 6 SECONDS LATER".

Then, the device control changer AA07 updates the "DEVICE CONTROL CHANGE INFORMATION" in the virtual computer information table BB01 (Step DD06). In this example, the device control changer AA07 returns the "DEVICE CONTROL CHANGE INFORMATION" of the virtual computer AA01 corresponding to the degraded device from "CONTROL IS CHANGED" to "CONTROL IS NOT CHANGED".

Next, the device control changer AA07 specifies the virtual computer AA01 which is to be returned from the power saving state, on the basis of the factor resulting from which the virtual computer system is returned from the power saving state, and updates the "VIRTUAL COMPUTER STATE INFORMATION" in the virtual computer information table BB01 (Step DD07).

In the case where a time-out interrupt occurs because the device AA08-2 is timed out, the device AA08-2 writes the identification number of the device AA08-2 and/or the interrupt factor into a register for interrupt control. Thus, the device control changer AA07 is operable to recognize that a time-out interrupt has occurred in the device AA08-2, referring to the register for interrupt control. By executing the above operation, the device control changer AA07 is operable to recognize the virtual computer AA01-2 that is to be returned from the power saving state to the ordinary state. Then, the device control changer AA07 updates the "VIRTUAL COMPUTER STATE INFORMATION" of the virtual computer AA01-2 from the "POWER SAVING STATE" to the "ORDINARY STATE".

Next, the total power saving controller AA06 outputs, to the power saving controller AA02 of the virtual computer AA01-2, in which the "VIRTUAL COMPUTER STATE INFORMATION" is changed from the "POWER SAVING STATE" to the "ORDINARY STATE" in Step DD07, a return request requesting returning the virtual computer AA01-2 from the power saving state to the ordinary state.

As described above, in the virtual computer system of the first embodiment, the virtual computer AA01 in the ordinary state exclusively uses the device AA08 corresponding to the virtual computer AA01. Accordingly, it is possible to suppress degradation of the performance. On the other hand, when all the virtual computers are shifted to the power saving state, the operating device performs a degraded control of the degraded device, whereby the power consumption can be reduced.

In the foregoing description, the device control changer AA07 causes the device AA08 to be degraded when all the virtual computers AA01 are brought to the power saving state. The invention is not limited to the above.

Specifically, in the case where the total power saving controller AA06 receives a shift request from a certain virtual computer AA01, the total power saving controller AA06 judges whether two or more predetermined number of the virtual computers AA01 including the virtual computer AA01 that has outputted the shift request are in the power saving state. Then, in the case where the total power saving controller AA06 judges that the predetermined number of the virtual computers AA01 are in the power saving state, the device control changer AA07 decides, out of the devices corresponding to the virtual computers AA01 in the power saving state, one of the devices as an operating device, and the rest of the devices as a degraded device or devices so that the operating device is allowed to perform the degraded control of the degraded device or devices. The predetermined number may be two or more. For instance, a value in accordance with a target power saving rate may be adopted, as necessary.

In the above arrangement, in the case where the predetermined number of virtual computers AA01 are in the power saving state in Step CC03 shown in FIG. 3, the judgment result in Step CC03 is determined to be affirmative; and in the case where all the virtual computers AA01 are in the ordinary state, the judgment result in Step CC03 is determined to be negative.

Then, in Step CC07, one of the devices AA08 whose time-out time is shortest is decided as the operating device, and the rest of the devices AA08 are decided as the degraded device or devices, out of the devices AA08 corresponding to the virtual computers AA01 in the power saving state.

There is a case that virtual computers AA01 which are rarely brought to the power saving state, and virtual computers AA01 which are frequently brought to the power saving state are used in combination, depending on the usage of the virtual computer system.

In the above case, it is hardly likely that all the virtual computers AA01 are brought to the power saving state, and it is substantially meaningless to adopt the configuration of degrading the device AA08.

In view of the above, in the case where virtual computers AA01 which are rarely brought to the power saving state, and virtual computers AA01 which are frequently brought to the power saving state are used in combination, it is preferable to adopt the configuration that the device AA08 is allowed to be degraded, if a predetermined number of the virtual computers are brought to the power saving state, although not all the virtual computers AA01 are brought to the power saving state.

On the other hand, in the case where all the virtual computers AA01 are frequently brought to the power saving state, adopting the configuration that the device AA08 is allowed to be degraded when a predetermined number of the virtual computers AA01 are brought to the power saving state may make management on the degraded device or devices and the operating device complicated. In view of the above, in the case where all the virtual computers AA01 are frequently brought to the power saving state, it is preferable to adopt the arrangement that the device AA08 is allowed to be degraded, in the case where all the virtual computers AA01 are brought to the power saving state.

Further, the devices AA08-1 through AA08-N may be divided into groups each constituted of a certain number of devices, and a processing of judging whether a processing of degrading the devices in the unit of group is to be executed may be executed. For instance, the devices AA08-1 through AA08-N are divided into a group G1 constituted of the devices AA08-1 through AA08-3, and a group G2 constituted of the devices AA08-4 through AA08-N. In this case, a degradation processing may be executed if the condition that all the virtual computers AA01-1 through AA01-3 of the group G1 are brought to the power saving state is satisfied, or a degradation processing may be executed if the condition that all the virtual computers AA01-4 through AA01-N of the group G2 are brought to the power saving state is satisfied.

Further alternatively, in the case where one of the virtual computers AA01-1 through AA01-3 of the group G1 is returned to the ordinary state, the group G1 may be released from the degraded state; and in the case where one of the virtual computers AA01-4 through AA01-N of the group G2 is returned to the ordinary state, the group G2 may be released from the degraded state.

Second Embodiment

A virtual computer system in the second embodiment is different from the virtual computer system in the first embodiment in a point that time measurement by an operating device is performed with low precision when the degraded control of a degraded device is performed by the operating device. In this embodiment, the same description as the description in the first embodiment is omitted, and the drawings used in describing the first embodiment are also used, as necessary.

In the second embodiment, a timer is used as a device AA08. The timer in this embodiment is a timer which is operable to switch between a first operation mode according to which the time is measured with a predetermined first precision, and a second operation mode according to which the time is measured with a precision lower than the first precision.

The low precision means that the resolution of measuring the time is low, as compared with the case where the time is measured with high precision. Accordingly, in the case where the timer is set to the second operation mode, the power to be consumed by the timer is reduced, as compared with the case where the timer is set to the first operation mode.

For instance, in the case where a wait time is measured in receiving a user's manipulation on a touch panel, a high-precision time measurement is required. In this case, it is preferable to set the timer to the first operation mode.

The difference in operation between the virtual computer system in the second embodiment and the virtual computer system in the first embodiment is as follows. First, a device controller AA03 sets a device AA08 corresponding to the device controller AA03 to the first operation mode in advance, so that the operation mode of the device AA08 corresponding to the device controller AA03 is not switched from the first operation mode to the second operation mode, even if a virtual computer AA01 corresponding to the device AA08 is brought to the power saving state.

In the first embodiment, in Step CC09 shown in FIG. 3, the device control changer AA07 stops the operation of the devices AA08-1, AA08-N as the degraded devices, and operates only the device AA08-2 as the operating device. In the second embodiment, in Step CC09, the device control changer AA07 stops the operation of the degraded devices in the same manner as in the first embodiment, but causes the device AA08-2 as the operating device to measure the time by switching the operation mode from the first operation mode to the second operation mode.

Further, in the second embodiment, in Step DD04 shown in FIG. 4, the device control changer AA07 switches only the operation mode of the device AA08-2 as the operating device from the second operation mode to the first operation mode, and resumes time measurement by the devices AA08-1, AA08-N as the degraded devices in a state that the first operation mode is retained.

Generally, in the power saving state, high-precision time measurement is not necessary. Accordingly, when the virtual computer AA01 is brought to the power saving state, the operation mode of the timer corresponding to the virtual computer AA01 is switched to the second operation mode of low precision. By executing the above operation, it is possible to reduce the power consumption.

However, in the case where the operation mode of the timer corresponding to the virtual computer AA01 is switched each time the virtual computer AA01 is shifted to the power saving state, the operation mode is switched by the number of times corresponding to the number of the virtual computers AA01.

In view of the above, in the second embodiment, in the case where each of the virtual computers AA01 is shifted to the power saving state, the operation mode of the timer is kept unchanged; in the case where degradation is started, only the operation mode of the operating device is switched from the first operation mode to the second operation mode; and in the case where the degradation is ended, only the operation mode of the operating device is switched from the second operation mode to the first operation mode. By executing the above operation, the number of times of switching the operation mode of the device AA08 is reduced, whereby the overhead resulting from switching the operation mode can be reduced.

Figure 6A:
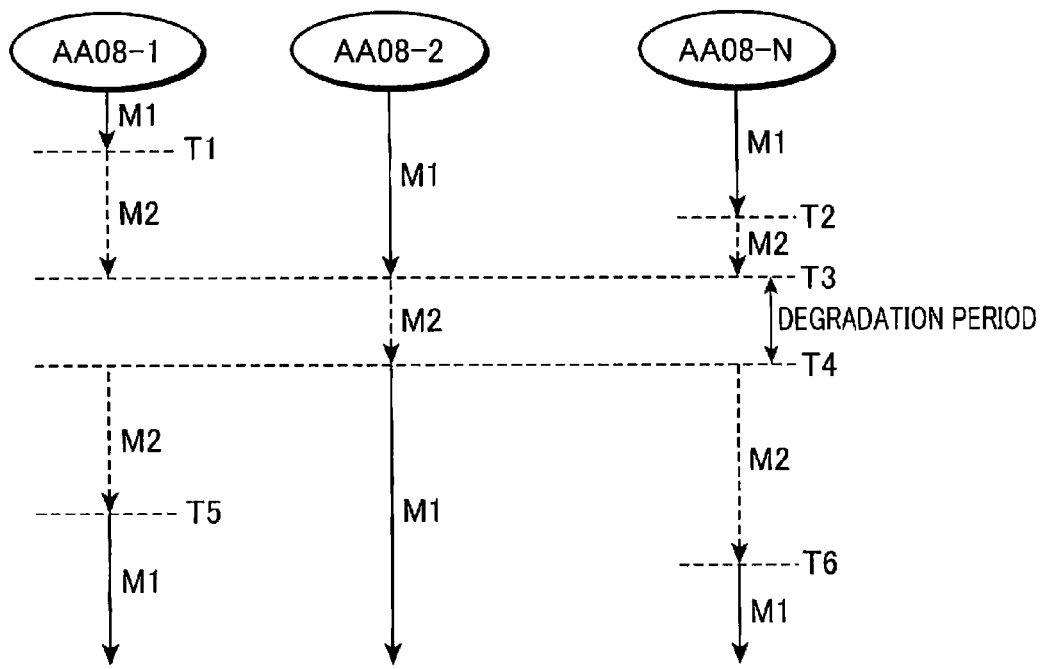
Figure 6B:
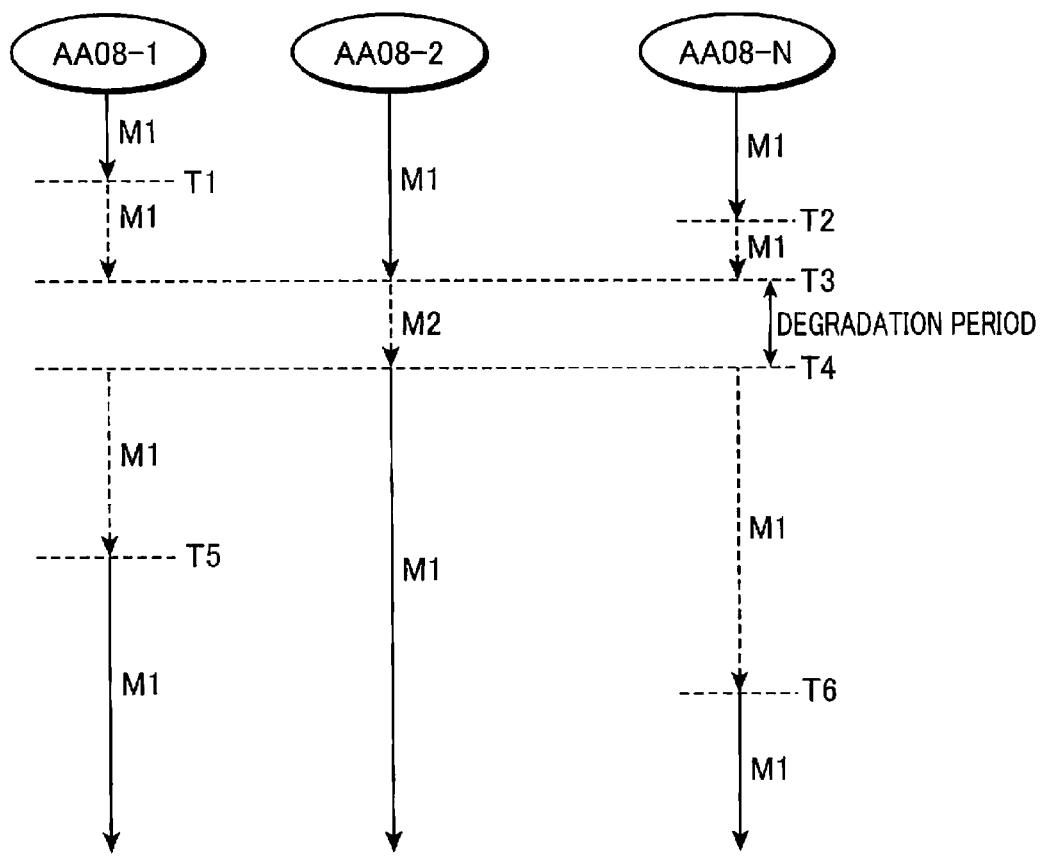

FIGS. 6A, 6B are explanatory diagrams showing an example of an operation to be executed by the virtual computer system in the second embodiment. FIG. 6A shows a case where a conventional configuration is applied, and FIG. 6B shows a case of the second embodiment. In FIGS. 6A and 6B, there are three devices AA08-1, AA08-2, AA08-N, as the devices AA08.

In FIG. 6A, a conventional configuration is applied. Accordingly, when the virtual computer AA01 is shifted from the ordinary state to the power saving state, the operation mode of the device AA08 corresponding to the virtual computer AA01 is switched from the first operation mode to the second operation mode, and when the virtual computer AA01 is shifted from the power saving state to the ordinary state, the operation mode of the device AA08 corresponding to the virtual computer AA01 is switched from the second operation mode to the first operation mode.

Specifically, at the points of time T1, T2, the virtual computers AA01-1, AA01-N are shifted to the power saving state. Accordingly, the operation mode of the devices AA08-1, AA08-N is switched from the first operation mode M1 to the second operation mode M2.

At the point of time T3, the virtual computer AA01-2 is shifted to the power saving state. Accordingly, the operation mode of the device AA08-2 is switched from the first operation mode M1 to the second operation mode M2.

Further, at the point of time T3, all the virtual computers AA01 are brought to the power saving state. Accordingly, the device AA08-2 whose time-out time is shortest is decided as the operating device, and the devices AA08-1, AA08-N are decided as the degraded devices, and the degraded control of the degraded devices is allowed to be performed by the operating device. By executing the above operation, a degradation period is started. During the degradation period, only the device AA08-2 as the operating device measures the time at the second operation mode M2.

At the point of time T4, a time-out interrupt occurs in the device AA08-2, and the virtual computer AA01-2 is returned from the power saving state to the ordinary state. Accordingly, the operation mode of the device AA08-2 is switched from the second operation mode M2 to the first operation mode M1, and the degradation period is ended. Concurrently, the time measurement by the devices AA08-1, AA08-N is resumed. However, since the virtual computers AA01-1, AA01-N are in the power saving state, the time measurement by the devices AA08-1, AA08-N is resumed at the second operation mode M2.

At the points of time T5, T6, the virtual computers AA01-1, AA01-N are returned from the power saving state to the ordinary state. Accordingly, the operation mode of the devices AA08-1, AA08-N is switched from the second operation mode M2 to the first operation mode M1.

As described above, in the example shown in FIG. 6A, it is clear that switching from the first operation mode M1 to the second operation mode M2 is executed in each of the devices AA08-1, AA08-2, AA08-N, and switching of the operation mode is executed at the points of time T1, T2, T3, T4, T5, T6 i.e. six times in total.

On the other hand, in FIG. 6B, even if the virtual computer AA01 is brought to the power saving state, the operation mode of the device AA08 corresponding to the virtual computer AA01 is not switched from the first operation mode M1 to the second operation mode M2, and in the case where a degradation period is started, the operation mode of only the operating device is switched from the first operation mode M1 to the second operation mode M2.

Specifically, at the points of time T1, T2, the virtual computers AA01-1, AA01-N are shifted from the ordinary state to the power saving state, but the operation mode of the devices AA08-1, AA08-N is not switched from the first operation mode M1 to the second operation mode M2.

At the point of time T3, the virtual computer AA01-2 is brought to the power saving state. Accordingly, the device AA08-2 is decided as the operating device, and the devices AA08-1, AA08-N are decided as the degraded devices, and a degradation period is started. During the degradation period, only the device AA08-2 as the operating device measures the time at the second operation mode M2.

At the point of time T4, a time-out interrupt occurs in the device AA08-2, and the virtual computer AA01-2 is returned from the power saving state to the ordinary state. Accordingly, the operation mode of the device AA08-2 is switched from the second operation mode M2 to the first operation mode M1, and the degradation period is ended. Concurrently, the time measurement by the devices AA08-1, AA08-N is resumed. At this time, however, the devices AA08-1, AA08-N resume the time measurement at the first operation mode M1, without switching the operation mode.

At the points of time T5, T6, the virtual computers AA01-1, AA01-N are returned from the power saving state to the ordinary state. However, the devices AA08-1, AA08-N are kept at the first operation mode M1, without being switched to the second operation mode M2. Accordingly, in the example shown in FIG. 6B, switching of the operation mode is executed at only at the two points of time T3, T4 i.e. only twice.

As described above, adopting the configuration of the second embodiment remarkably reduces the number of times of switching the precision of the device AA08. On the other hand, during a degradation period, the time is measured only by the operating device, and the operating device executes the time measurement at the second operation mode. Thus, it is possible to reduce the power consumption rate.

In the second embodiment, the device AA08 is allowed to be degraded when all the virtual computers AA01 are brought to the power saving state. Alternatively, however, as described in the first embodiment, the device AA08 may be allowed to be degraded when a predetermined number of virtual computers AA01 are brought to the power saving state.

Third Embodiment

A virtual computer system in the third embodiment has a feature that a NIC (Network Interface Card, an example of a communications device) is used as a device AA08. In this embodiment, the same description as in the first and second embodiments is omitted.

There is a case that a computer equipped with an NIC keeps the NIC in an activated state for responding to communications from an external device when the computer is shifted to the power saving state. Further, with use of the NICs, it is possible to assign the functions of a plurality of the NICs to one of the NICs by assigning a plurality of IP addresses to the one NIC with use of a function called IP alias.

The computer system in the third embodiment is configured in such a manner that in the ordinary state, each of the virtual computers AA01 individually and exclusively has a NIC corresponding thereto. Further, in the case where the virtual computers AA01 are individually shifted to the power saving state, the NICs are kept in an activated state. Then, when all the virtual computers AA01 are brought to the power saving state, one of the NICs as the operating device is assigned with the IP addresses of the rest of the NICs, and the operation of the rest of the NICs is stopped. By executing the above operation, the degraded control of the rest of the NICs is allowed to be performed by the one of the NICs.

Then, when a certain virtual computer AA01 is returned to the ordinary state in response to transmission of a packet from an external device to the virtual computer AA01, the IP addresses assigned to the one of the NICs are returned to the rest of the NICs to operate all the NICs. By executing the above operation, it is possible to suppress the power consumption rate.

FIG. 5 is a diagram showing an example of a virtual computer table EE01 in the third embodiment of the invention. In this embodiment, "DEVICE CONTROL INFORMATION" is different from those described in FIG. 3, because the device AA08 is an NIC in this embodiment. Further, in this embodiment, the device having the indication "CONTROL IS CHANGED" is the operating device, and the device having the indication "CONTROL IS NOT CHANGED" is the degraded device.

In the example shown in FIG. 5, although all the virtual computers AA01 are in the power saving state, the "DEVICE CONTROL CHANGE INFORMATION" of the virtual computer AA01-1 indicates "CONTROL IS CHANGED", and the "DEVICE CONTROL CHANGE INFORMATION" of the rest of the virtual computers i.e. the virtual computer AA01-2, AA01-N indicates "CONTROL IS NOT CHANGED". Therefore, the device AA08-1 of the virtual computer AA01-1 is decided as the operating device, and the devices AA08-2 through AA08-N of the virtual computers AA01-2, AA01-N are decided as the degraded devices.

Accordingly, whereas the "DEVICE CONTROL INFORMATION" of the virtual computer AA01-1 indicates "WAIT FOR PACKET (VIRTUAL COMPUTER AA01-1 THROUGH VIRTUAL COMPUTER AA01-N", the "DEVICE CONTROL INFORMATION" of the rest of the virtual computers AA01-2 through AA01-N indicate "WAIT FOR PACKET".

The above description clearly shows that the IP addresses of the devices AA08-2 through AA08-N are assigned to the device AA08-1.

FIG. 7 is an explanatory diagram showing an example of an operation to be executed by the virtual computer system in the third embodiment. At the points of time T1, T2, the virtual computers AA01-1, AA08-N are shifted to the power saving state. Thus, the devices AA08-1, AA08-N are brought to a state waiting for a packet.

At the point of time T3, the virtual computer AA01-2 is shifted to the power saving state, and thus, all the virtual computers AA01 are brought to the power saving state. Then, the device control changer AA07 decides the operating device. In the example shown in FIG. 7, the device AA08-2 is decided as the operating device, and the devices AA08-1, AA08-N are decided as the degraded devices. Accordingly, the device control changer AA07 operates only the device AA08-2, and stops the devices AA08-1, AA08-N.

In deciding the operating device, the device control changer AA07 obtains, for instance, an operating rate of each of the virtual computers AA01, and decides one of the devices AA08 having a highest operating rate as the operating device.

In this example, in obtaining the operating rate, the device control changer AA07 obtains an operating rate of each of the virtual computers AA01 by e.g. measuring an operating time of each of the virtual computers AA01 during a predetermined period in the past, and by dividing the measured operating time with the predetermined period. In this example, the device control changer AA07 manages e.g. a point of time when each of the virtual computers AA01 is shifted to the power saving state, and a point of time when each of the virtual computers AA01 is returned to the ordinary state, as an operation log; and obtains a time during which each of the devices AA01 is in the ordinary state, as an operating time, referring to the operation log.

Executing the above operation reduces the likelihood that the device AA08-2 may receive a packet transmitted to the virtual computers AA01-1, AA01-N during a degradation period. As a result of executing the above operation, it is possible to reduce the likelihood that the device AA08-2 may transfer the received packet to the virtual computers AA01-1, AA01-N, which are the virtual computers other than the virtual computer AA01-2 corresponding to the device AA08-2. This arrangement enables to reduce the processing load of the device AA08-2.

Alternatively, the device control changer AA07 may decide a device AA08 having a broadest communications band, as the operating device. Each of the devices AA08 may be constituted of an NIC whose communications band is different from each other, depending on the usage of the virtual computer system. In such a case, if an NIC having a narrow communications band is decided as the operating device, the processing load of the NIC increases, which is not preferable. In view of the above, the device control changer AA07 decides a device AA08 having a broadest communications band as the operating device. In the case where the above configuration is adopted, the device control changer AA07 is operable to recognize the communications band of each of the devices AA08.

Referring back to FIG. 7, at the point of time T4, the device AA08-2 receives a packet transmitted to e.g. the virtual computer AA01-1, and transfers the received packet to the virtual computer AA01-1 for returning the virtual computer AA01-1 to the ordinary state. Concurrently, the device control changer AA07 returns the IP address assigned to the device AA08-2 to the devices AA08-1, AA08-N, and resumes the operation of the devices AA08-1, AA08-N, for terminating the degradation period.

In the third embodiment, the device AA08 is allowed to be degraded when all the virtual computers AA01 are brought to the power saving state. However, as described in the first embodiment, the device AA08 may be allowed to be degraded when at least two of the virtual computers AA01 are brought to the power saving state.

Each of the functional blocks of the virtual computer system shown in FIG. 1 is typically implemented as a program to be processed by cooperation of a processor and an external memory, but may be implemented by an LSI as an integrated circuit. Each of the functional blocks may be individually formed into a one-chip device, or a part or all of the functional blocks may be formed into a one-chip device. In this example, the integrated circuit is an LSI. The integrated circuit may also be called as an IC, a system LSI, a super LSI or an ultra LSI, depending on the degree of integration.

Further alternatively, the integrated circuit method is not limited to an LSI method. The integrated circuit may be implemented by a dedicated circuit or a general-purpose processor. After fabricating an LSI, an FPGA (Field Programmable Gate Array) capable of programming, or a reconfigurable processor capable of reconfiguring connection or setting of circuit cells within the LSI may also be used.

Further, if an integration circuit technology substantially equivalent to the LSI technology is developed in the future by the progress of semiconductor technology or by another technology derived from the semiconductor technology, it is needless to say that the functional blocks may be integrated using such technology.

Furthermore, as far as the device is a computer processing device provided with a processor and a timer, the invention is also applicable to all the computers, electronic equipment, information equipment, AV equipment, communications equipment and household electrical appliances, for instance, to PCs (personal computers), mobile information terminals (such as mobile phones, smart phones and PDAs), televisions, hard disk recorders, various disc recorders using e.g. DVDs and blu-ray discs, various disc players using e.g. DVDs and blu-ray discs, and car navigation systems.

The foregoing description is merely an example of the invention in every aspect, and does not limit the scope of the invention. It is needless to say that various improvements or modifications may be implemented, as far as such improvements or modifications do not depart from the scope of the invention hereinafter defined.

The following is a summary of the technical features of the virtual computer system.

(1) The aforementioned virtual computer system is a virtual computer system including a plurality of virtual computers; a plurality of devices provided in correspondence to the respective virtual computers and to be exclusively used by the respective corresponding virtual computers; and a hypervisor for controlling the virtual computers. The virtual computer includes a device controller which controls the corresponding device; and a power saving controller which executes power saving control of the corresponding virtual computer. The hypervisor includes a total power saving controller which manages a state of each of the virtual computers; a virtual computer information storage which stores virtual computer information, the virtual computer information including a state of the virtual computer and information relating to control of the device; and a device control changer which changes the control of the device. In this arrangement, in the case where the total power saving controller receives, from the power saving controller, a shift request requesting shifting the virtual computer corresponding to the power saving controller from an ordinary state to a power saving state, the total power saving controller judges whether two or more predetermined number of the virtual computers including the virtual computer which has outputted the shift request are in the power saving state, referring to the virtual computer information, and in the case where the total power saving controller judges that the predetermined number of the virtual computers are in the power saving state, the device control changer decides, out of the devices corresponding to the virtual computers in the power saving state, one of the device to be operated as an operating device, and the rest of the devices as a degraded device, for causing the operating device to perform a degraded control of the degraded device.

In the above arrangement, in the case where the virtual computer system is in the ordinary state, each of the virtual computers is allowed to exclusively use the device corresponding to each virtual computer. Thus, it is possible to suppress degradation of the performance of the virtual computer system, as compared with a case of using e.g. a shared scheme, in which a plurality of virtual computers share one device.

In the above arrangement, on the other hand, in the case where one of the virtual computers outputs a shift request requesting shifting the virtual computer to the power saving state, it is judged whether two or more predetermined number of the virtual computers are in the power saving state. Then, out of the devices of the virtual computers in the power saving state, one of the devices is decided as an operating device, and the rest of the devices is decided as a degraded device, and the operating device is allowed to perform a degraded control of the degraded device. In the specification, degradation means that a degraded control of the degraded device is performed by the operating device, and the operation of the degraded device is stopped or the degraded device is operated in a power saving state, whereas only the operating device is operated in an ordinary state.

Accordingly, in the above arrangement, in the case where the predetermined number of the virtual computers are brought to the power saving state, out of the devices corresponding to the virtual computers in the power saving state, only one of the devices is operated, and the operation of the rest of the devices is stopped. The above control is advantageous in enhancing the power saving control, as compared with the arrangement that all the devices are constantly operated as in a dedicated scheme.

(2) Preferably, the device control changer may resume the operation of the degraded device in the case where one of the virtual computers in the power saving state is returned to the ordinary state.

In the above arrangement, the degraded device is released from the degraded state in response to returning one of the virtual computers in the power saving state to the ordinary state. This is advantageous in simplify the processing.

(3) Preferably, the device may be a timer.

In the above arrangement, since the device is constituted of a timer, it is possible to cause the operating device to perform the degraded control of the degraded device.

(4) Preferably, the timer may count a time until the corresponding virtual computer returns to the ordinary state, and the device control changer may decide, out of the timers corresponding to the virtual computers in the power saving state, a timer corresponding to the virtual computer having a shortest time required for returning to the ordinary state, as the operating device.

In the above arrangement, a timer corresponding to the virtual computer having a shortest time required for returning the virtual computer to the ordinary state is decided as the operating device. Thus, it is possible to obtain a time-out time of the timer i.e. the degraded device, using the time-out time of the timer or a measured time in the case where the timer i.e. the operating device is timed out. Thus, the rest of the virtual computers in the power saving state can be returned to an ordinary state at an initially scheduled time-out time.

(5) Preferably, the timer may be operable to switch between a first operation mode according to which the timer measures the time with a predetermined first precision, and a second operation mode according to which the timer measures the time with a precision lower than the first precision, the device controller may set the corresponding timer to the first operation mode in advance, and may keep an operation mode of the timer even after the corresponding virtual computer is brought to the power saving state, and the device control changer may switch the operating device to the second operation mode in the case where the operating device is allowed to perform the degraded control of the degraded device, and may switch the operating device to the first operation mode in the case where the degraded control of the degraded device is returned to the ordinary state.

In the above arrangement, the operation mode is switched from the first operation mode to the second operation mode, in the case where only the operating device is allowed to perform a degraded control or the degraded device is released from the degraded state, whereby the operation mode of the degraded device is kept in the first operation mode. This enables to reduce the number of times of switching the operation mode, and reduce the overhead resulting from switching the operation mode.

(6) Preferably, the device may be a communications device.

In the above arrangement, the device is constituted of a communications device. Accordingly, it is possible to allow a device to perform a degraded control by e.g. assigning, to the communications device of the operating device, a communications address of the communications device of the degraded device.

(7) Preferably, the device control changer may decide, out of the devices corresponding to the virtual computers in the power saving state, a device corresponding to the virtual computer having a highest operating rate, as the operating device.

In the above arrangement, it is possible to reduce the likelihood that the communications device of the operating device may receive a packet which is transmitted to a virtual computer other than the virtual computer corresponding to the operating device. Thus, it is possible to reduce the likelihood that the communications device of the operating device may transfer the received packet to a virtual computer other than the virtual computer corresponding to the operating device. This enables to reduce the processing load of the communications device.

(8) Preferably, the device control changer may decide, out of the devices corresponding to the virtual computers in the power saving state, a device having a broadest communications band, as the operating device.

In the above arrangement, there is no likelihood that the communications device having a narrow communications band may be decided as the operating device. Thus, it is possible to prevent the processing load of the communications device from increasing.

(9) Preferably, the device control changer may judge whether the device is a device that is allowed to be degraded, on the basis of a type of the device, and may cause the operating device to perform the degraded control of the degraded device, in the case where the device control changer judges that the device is the device that is allowed to be degraded.

In the above arrangement, even in the case where a user who purchased the virtual computer system mounts an optional device, it is possible to provide the virtual computer system with versatility because it is judged whether the optional device is a device that is allowed to be degraded, based on the type of the device.

(10) Preferably, the state of the virtual computer may be represented by virtual computer state information indicating whether the virtual computer is in the power saving state, and the information relating to the control of the device may include device control information indicating control contents of the device, and device control change information indicating whether the control of the device has been changed.

In the above arrangement, it is possible to recognize whether each of the virtual computers is currently in the power saving state, as well as the current control contents of each of the devices, and presence or absence of a change in control of each of the devices, referring to the virtual computer state information.

(11) Preferably, the total power saving controller may update the virtual computer state information of the virtual computer which has outputted the shift request from the ordinary state to the power saving state, in the case where the total power saving controller receives the shift request requesting shifting the virtual computer to the power saving state from the power saving controller, and the device control changer may update the device control change information of the operating device or the degraded device, in the case where the operating device is allowed to perform the degraded control of the degraded device.

In the above arrangement, it is possible to update the virtual computer state information and the device control change information with high precision.

(12) Preferably, the device control changer may cause the operating device to perform the degraded control of the degraded device, in the case where the total power saving controller judges that all the virtual computers are in the power saving state.

In the above arrangement, a device is allowed to be degraded in response to bringing all the virtual computers to the power saving state. This is advantageous in simplifying the processing.

INDUSTRIAL APPLICABILITY

The present invention is advantageous in suppressing degradation of the performance of a virtual computer system, and at the same time, reducing the power consumption rate; and is useful in e.g. computers, household electrical appliances, mobile terminals in which a plurality of virtual computers are operated.

The invention claimed is:
1. A virtual computer system, comprising:
a plurality of virtual computers;
a plurality of devices provided in correspondence to the respective virtual computers and to be exclusively used by the respective corresponding virtual computers; and
a hypervisor for controlling the virtual computers,
each of the virtual computers including:
  a device controller which controls the corresponding device; and
  a power saving controller which executes power saving control of the corresponding virtual computer,
the hypervisor including:
  a total power saving controller which manages a state of each of the virtual computers;
  a virtual computer information storage which stores virtual computer information, the virtual computer information including a state of each of the virtual computers and information relating to control of the devices; and
  a device control changer which changes the control of the devices, wherein
in the case where the total power saving controller receives, from the power saving controller, a shift request requesting shifting the virtual computer corresponding to the power saving controller from an ordinary state to a power saving state, the total power saving controller judges whether two or more predetermined number of the virtual computers including the virtual computer which has outputted the shift request are in the power saving state, by referring to the virtual computer information, and
in the case where the total power saving controller judges that the two or more predetermined number of the virtual computers are in the power saving state, the device control changer decides, out of the devices corresponding to the virtual computers in the power saving state, (i) one of the devices to be operated as an operating device and (ii) the rest of the devices to be operated as degraded devices, the operating device performing control of the degraded devices so that the degraded devices stop operating or operate in a power saving state while only the operating device operates in an ordinary state.

2. The virtual computer system according to claim 1, wherein
for each of the degraded devices, the device control changer returns control of the degraded device to the ordinary state in the case where the virtual computer in the power saving state corresponding to the degraded device is returned to the ordinary state.

3. The virtual computer system according to claim 1, wherein
the device is a timer, which counts a returning time until the corresponding virtual computer returns to the ordinary state, and
the device control changer (i) decides, as the operating device, a timer corresponding to the virtual computer having a shortest returning time required for returning to the ordinary state out of the timers corresponding to the virtual computers in the power saving state, (ii) causes the operating device to count the returning time of the degraded devices until the shortest running time which is the returning time of the operating device elapses, and (iii) causes the degraded devices to count a remaining returning time that is a remainder of subtraction of the shortest returning time from the returning time of the degraded devices after the shortest returning time elapses.

4. The virtual computer system according to claim 3, wherein
the timer is operable to switch between a first operation mode according to which the timer measures the time with a predetermined first precision, and a second operation mode according to which the timer measures the time with a precision lower than the first precision,
the device controller sets the corresponding timer to the first operation mode in advance, and keeps an operation mode of the timer even after the corresponding virtual computer is brought to the power saving state, and
the device control changer (i) switches the operating device to the second operation mode in the case where the operating device is allowed to perform control of the degraded devices and (ii) switches the operating device to the first operation mode in the case where control of a degraded device, out of the degraded devices, is returned to the ordinary state.

5. The virtual computer system according to claim 1, wherein
the device is a communications device, and
for each of the degraded devices, the device control changer (i) assigns a network address of the degraded devices to the operating device to stop the operation of the degraded device when the two or more predetermined number of the virtual computers are judged to be in a power saving state and (ii) returns the network address of the degraded device having been assigned to the operating device to the degraded device when the operating device receives a packet transmitted to the virtual computer corresponding to the degraded device.

6. The virtual computer system according to claim 5, wherein
the device control changer decides, as the operating device, a device corresponding to the virtual computer having a highest operating rate out of the devices corresponding to the virtual computers in the power saving state.

7. The virtual computer system according to claim 5, wherein
the device control changer decides, as the operating device, a device having a broadest communications band out of the devices corresponding to the virtual computers in the power saving state.

8. The virtual computer system according to claim 1, wherein
for each of the rest of the devices to be operated as the degraded devices, the device control changer (i) judges whether the device is a device that is allowed to be degraded, on the basis of a type of the device, and (ii) causes the operating device to control the degraded device in the case where the device control changer judges that the device is allowed to be degraded.

9. The virtual computer system according to claim 1, wherein
for each of the virtual computers, the state of the virtual computer is represented by virtual computer state information indicating whether the virtual computer is in the power saving state, and
for each of the devices, the information relating to the control of the device includes (i) device control information indicating control contents of the device and (ii) device control change information indicating whether the control of the device has been changed.

10. The virtual computer system according to claim 9, wherein
the total power saving controller updates the virtual computer state information of the virtual computer which has outputted the shift request from the ordinary state to the power saving state, in the case where the total power saving controller receives the shift request requesting shifting the virtual computer to the power saving state from the power saving controller, and
the device control changer updates the device control change information of the operating device or the degraded devices, in the case where the operating device is allowed to perform control of the degraded devices.

11. The virtual computer system according to claim 1, wherein
the device control changer causes the operating device to perform the control of the degraded devices, in the case where the total power saving controller judges that all the virtual computers are in the power saving state.

12. A device sharing control method by a virtual computer system provided with a plurality of virtual computers, a plurality of devices provided in correspondence to the respective virtual computers and to be exclusively used by the respective corresponding virtual computers, and a hypervisor for controlling the virtual computers, the method comprising:
a device control step of controlling the devices;
a power saving control step of executing power saving control of the virtual machines;
a total power saving control step of managing a state of each of the virtual computers by the hypervisor; and
a device control changing step of changing control of the devices, wherein
the total power saving control step includes:
in the case where the hypervisor receives a shift request issued in the power saving control step by one of the virtual computers requesting shifting the one of the virtual computers from an ordinary state to a power saving state, judging whether two or more predetermined number of the virtual computers including the virtual computer which has outputted the shift request are in the power saving state, by referring to virtual computer information including a state of each of the virtual computers and information relating to the control of the devices, and
the device control changing step includes:
in the case where it is judged that the two or more predetermined number of the virtual computers are in the power saving state in the total power saving control step, in the device control changing step, deciding (i) one of the devices to be operated as an operating device, and (ii) the rest of the devices to be operated as degraded devices, the operating device performing control of the degraded devices so that the degraded devices stop operating or operate in a power saving state while only the operating device operates in an ordinary state.

13. A non-transitory computer-readable recording medium which stores a program which functions a computer as a virtual computer system provided with a plurality of virtual computers, a plurality of devices provided in correspondence to the respective virtual computers and to be exclusively used by the respective corresponding virtual computers, and a hypervisor for controlling the virtual computers, the program being operable to:
function each of the virtual computers as
a device controller which controls the corresponding device; and
a power saving controller which executes power saving control of the corresponding virtual computer, and
function the hypervisor as
a total power saving controller which manages a state of each of the virtual computers;
a virtual computer information storage which stores virtual computer information, the virtual computer information including a state of each of the virtual computers and information relating to control of the devices; and
a device control changer which changes the control of the devices, wherein
in the case where the total power saving controller receives, from the power saving controller, a shift request requesting shifting the virtual computer corresponding to the power saving controller from an ordinary state to a power saving state, the total power saving controller judges whether two or more predetermined number of the virtual computers including the virtual computer which has outputted the shift request are in the power saving state, by referring to the virtual computer information, and
in the case where the total power saving controller judges that the two or more predetermined number of the virtual computers are in the power saving state, the device control changer decides, out of the devices corresponding to the virtual computers in the power saving state, (i) one of the devices to be operated as an operating device and (ii) the rest of the devices to be operated as degraded devices, the operating device performing control of the degraded devices so that the degraded devices stop operating or operate in a power saving state while only the operating device operates in an ordinary state.

14. An integrated circuit of a virtual computer system, the integrated circuit comprising:
   a plurality of virtual computers;
   a plurality of devices provided in correspondence to the respective virtual computers and to be exclusively used by the respective corresponding virtual computers; and
   a hypervisor for controlling the virtual computers,
   each of the virtual computers including:
      a device controller which controls the corresponding device; and
      a power saving controller which executes power saving control of the corresponding virtual computer, and
   the hypervisor including:
      a total power saving controller which manages a state of each of the virtual computers;
      a virtual computer information storage which stores virtual computer information, the virtual computer information including a state of each of the virtual computers and information relating to control of the devices; and
      a device control changer which changes the control of the devices, wherein in the case where the total power saving controller receives, from the power saving controller, a shift request requesting shifting the virtual computer corresponding to the power saving controller from an ordinary state to a power saving state, the total power saving controller judges whether two or more predetermined number of the virtual computers including the virtual computer which has outputted the shift request are in the power saving state, by referring to the virtual computer information, and in the case where the total power saving controller judges that the two or more predetermined number of the virtual computers are in the power saving state, the device control changer decides, out of the devices corresponding to the virtual computers in the power saving state, (i) one of the devices to be operated as an operating device, and (ii) the rest of the devices to be operated as degraded devices, the operating device performing control of the degraded devices so that the degraded devices stop operating or operate in a power saving state while only the operating device operates in an ordinary state.

* * * * *